Figure 1:
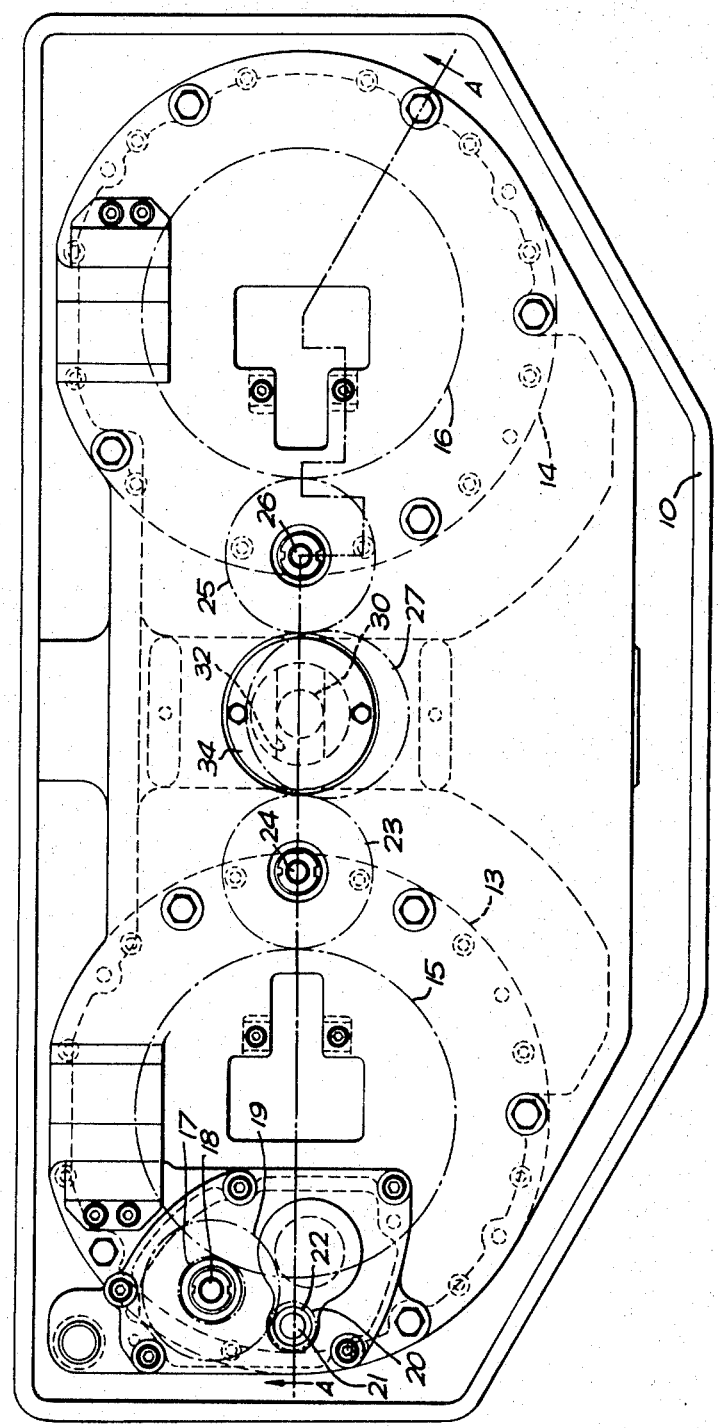

United States Patent
Goodacre

[11] 3,731,552
[45] May 8, 1973

[54] DIFFERENTIAL GEAR MECHANISMS

[75] Inventor: Cecil Goodacre, Basingstoke, England

[73] Assignee: Lansing Bagnall Limited, Basingstoke, England

[22] Filed: Feb. 10, 1972

[21] Appl. No.: 225,184

[30] Foreign Application Priority Data

Feb. 12, 1971 Great Britain.....................4,578/71

[52] U.S. Cl....................................................74/393
[51] Int. Cl.............................................F16h 35/02
[58] Field of Search..............................74/393, 714

[56] References Cited

UNITED STATES PATENTS 2,866,409  12/1958  Buttner............................74/393 UX

*Primary Examiner*—Leonard H. Gerin
*Attorney*—Cushman, Darby & Cushman

[57] ABSTRACT

A differential gear mechanism comprises two spaced gear wheels in mesh with an intermediate gear wheel disposed between them, the intermediate gear wheel being arranged, so it rotates, to move laterally between the gear wheels so as to effect differential rotation of the gear wheels. The intermediate gear wheel is elliptical, the minor axis of the ellipse lying along a line joining the centers of the gear wheels when the intermediate gear wheel is symmetrically disposed between them. The eccentricity of the ellipse is such that as the intermediate gear wheel moves laterally the increase in the distance apart of the portions of the gear wheels with which it meshes is substantially compensated for by the increase in the effective diameter of the intermediate gear wheel between those portions, as a result of its rotation, so that the intermediate gear wheel remains in mesh with the gear wheels during its lateral movement.

6 Claims, 2 Drawing Figures

DIFFERENTIAL GEAR MECHANISMS

The invention relates to differential gear mechanisms and particularly but not exclusively to gear mechanisms for effecting steering movement of two steerable wheels of a vehicle.

The invention relates to differential gear mechanisms of the kind comprising two spaced gear wheels in mesh with an intermediate gear wheel disposed between them, the intermediate gear wheel having means which cause it, as it rotates, to move laterally between the gear wheels so as to effect differential rotation of the gear wheels. It will be appreciated that as the intermediate gear wheel moves laterally the portions of the two gear wheels with which it meshes become farther apart so that the intermediate gear wheel begins to come out of mesh with the two gear wheels causing an increase in backlash which may be undesirable. In some cases this may be overcome by arranging for one of the two gear wheels to be movably mounted so that it may move bodily to remain in meshing engagement with the intermediate gear wheel. For example there may be provided two links one connecting the fixed gear wheel with the intermediate gear wheel and the other connecting the intermediate gear wheel with the movable gear wheel. The intermediate gear wheel may thus move laterally relatively to the two gear wheels, due to relative movement between the links, but the links maintain the gears in mesh during said relative movement. In some cases however it may be undesirable for one of the two gear wheels to be bodily movable and the object of the present invention is to provide an arrangement whereby backlash between the gears may be reduced without the necessity of one of the two gear wheels being bodily movable.

According to the invention therefore a differential gear mechanism of the kind first referred to is characterized in that the intermediate gear wheel is elliptical, the minor axis of the ellipse lying along a line joining the centers of the gear wheels when the intermediate gear wheel is symmetrically disposed between them, and the eccentricity of the ellipse being such that as the intermediate gear wheel moves laterally the increase in the distance apart of the portions of the gear wheels with which it meshes is substantially compensated for by the increase in the effective diameter of the intermediate gear wheel between those portions, as a result of its rotation, so that the intermediate gear wheel remains in mesh with the gear wheels during said lateral movement.

Said means causing the intermediate gear wheel to move laterally as it rotates may comprise a sliding connection between the intermediate gear wheel and a fixed member, the connection being offset from the center of the intermediate gear wheel.

The sliding connection may comprise a guide on the fixed member, and a follower on the intermediate gear wheel, the follower being offset from the center of the intermediate gear wheel so that engagement of the follower with the guide, as the intermediate gear wheel rotates, effects said lateral movement of the intermediate gear wheel.

The guide preferably extends in a substantially straight line. The guide may lie along the line joining the centers of the two gear wheels, the follower lying on the minor axis of the ellipse.

The guide may comprise a groove or slot in the fixed member and the follower may comprise a roller or like member projecting from the intermediate gear wheel and slidable along the groove or slot.

The invention includes within its scope a steering mechanism for a vehicle and comprising a differential gear mechanism as referred to above wherein the two spaced gear wheels are connected respectively with two steerable ground wheels of the vehicle in such manner that rotation of the gear wheels is accompanied by steering movement of the ground wheels. For example, each steerable ground wheel may have rotatable therewith a further gear wheel which is coaxial with the upwardly extending steering axis of the ground wheel, which further gear wheels are in mesh with the aforementioned two gear wheels respectively.

A manually operable steering wheel may be connected with one of said ground wheels to effect steering movement thereof, a differential steering movement being transmitted to the other ground wheel via said further gear wheels and the differential gear mechanism.

The invention also includes within its scope a vehicle having steerable ground wheels interconnected by a differential steering mechanism of the kind referred to.

Figure 2:
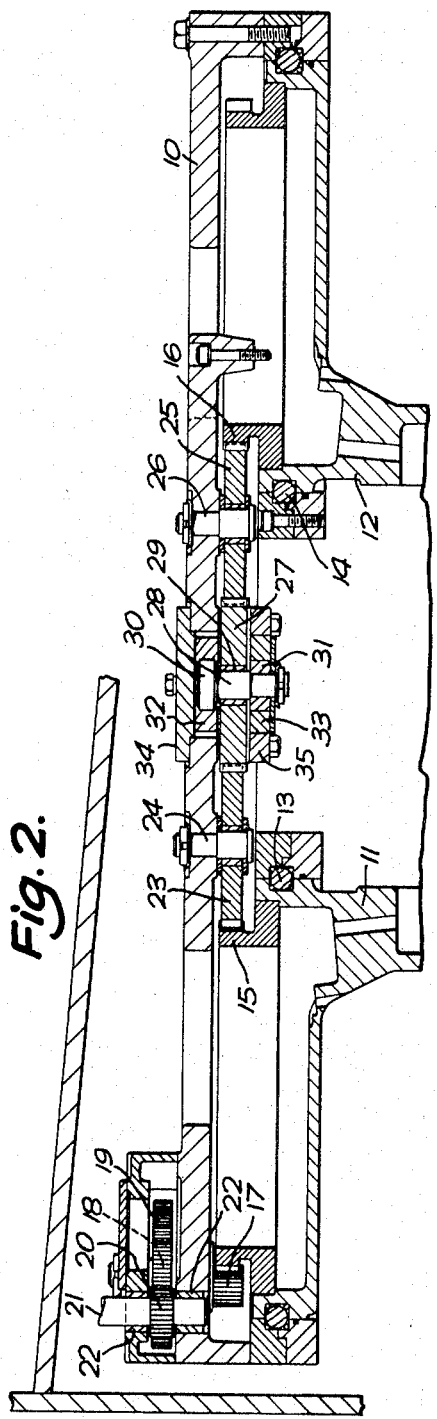

The following is a more detailed description of one embodiment of the invention reference being made to the accompanying drawing in which:

FIG. 1 is a plan view of a differential steering mechanism according to the invention, and FIG. 2 is a vertical section through the mechanism shown in FIG. 1, along the line A — A.

The steering mechanism comprises a fixed frame 10 mounted on the vehicle. Two steerable wheel assemblies 11 and 12 are rotatable about vertical axes in bearing 13 and 14 respectively on the frame 10. Each of the wheel assemblies 11 and 12 may comprise, in known manner, an integrally mounted motor for imparting driving movement to the wheels.

The wheel assemblies 11 and 12 are provided at the upper ends thereof with gear wheels 15 and 16 respectively which are coaxial with the vertical axis of steering movement of the wheel assemblies.

The gear wheel 15 on the wheel assembly 11 is in mesh with a pinion 17 carried on the lower end of a shaft 18 mounted vertically on the frame 10. The shaft 18 carries another gear wheel 19 which is in mesh with a further pinion 20 carried on the lower end of a vertical steering column 21 which is mounted in bearings 22 in the frame 10. Thus rotation of the steering column 21 effects steering rotation of the wheel assembly 11.

The gear wheel 15 on the wheel assembly 11 is also in mesh with a gear wheel 23 which is rotatable on a vertical stub shaft 24 mounted on the frame 10. Similarly the gear wheel 16 on the wheel assembly 12 is in mesh with a gear wheel 25 which is rotatoble on a stub shaft 26 which is also fixed to the frame 10.

Disposed between the gear wheels 23 and 25 and in mesh with them is an elliptical intermediate gear wheel 27. The diameter of the elliptical gear wheel 27 across its minor axis is equal to the spacing apart of the gear wheels 23 and 25 so that when the gear wheel 27 is symmetrically disposed with respect to the gear wheels 23 and 25 its minor axis lies along the line joining the centers of those gear wheels.

Disposed on the minor axis of the elliptical gear wheel 27 but spaced from the center of the gear wheel is a stub shaft 28 which is carried in a bearing 29. The ends of the shaft 28, on opposite sides of the gear wheel 27 carry rollers 30 and 31. The rollers 30 and 31 are slidable in grooves 32 and 33 respectively in fixed members 34 and 35 respectively which are secured to the frame 10 above and below the elliptical intermediate gear wheel 27. As best seen from FIG. 1 the grooves 32 and 33 lie along the line joining the centers of the gear wheels 23 and 25. It will thus be seen that as the intermediate gear wheel 27 rotates, due to the rollers 30 and 31 being offset from the center of the intermediate gear wheel, the intermediate gear wheel will be moved laterally with respect to the gear wheels 23 and 25 (i.e. it will move transversely to the line joining the centers of the gear wheels 23 and 25). As mentioned above when the intermediate gear wheel 27 is disposed symmetrically with respect to the line joining the centers of the gear wheels 23 and 25, its minor axis lies along that line. When steering movement is applied to the wheel assembly 11 through the steering column 21 the gear wheel 23 will rotate rotating in turn the intermediate gear wheel 27. Rotation of the intermediate gear wheel 27 will rotate the gear wheel 25 and thus impart steering movement to the wheel assembly 12 but due to the fact that the intermediate gear wheel 27 moves laterally as well as rotating the gear wheel 25 will rotate to a different extent from the gear wheel 23 and thus differential steering movement will be applied to the two wheel assemblies 11 and 12.

As the intermediate gear wheel 27 moves laterally with respect to the gear wheels 23 and 25 it will be seen that the portions of those gear wheels with which it meshes become farther apart. However since the intermediate gear wheel 27 is elliptical, as it rotates and moves laterally, its effective diameter between the portions of the gear wheels 23 and 25 with which it meshes will increase and the eccentricity of the ellipse is such that this increase substantially compensates for the increase in the distance apart of the portions of the gear wheels 23 and 25 with which the intermediate gear wheel meshes. The intermediate gear wheel thus remains in mesh with the gear wheels 23 and 25. FIG. 1 shows the position in which the intermediate gear wheel 27 has its major axis parallel but spaced from the line joining the centers of the gear wheels 23 and 25. In this position, the ground wheels are in a straight-ahead position and to rotate the wheels to a full lock position the intermediate gear is rotated through 180° on either side of the straight-ahead position.

I claim:

1. A differential gear mechanism comprising: two spaced gear wheels; an intermediate gear wheel disposed between the spaced gear wheels and in mesh with them; means causing the intermediate gear wheel, as it rotates, to move laterally between the spaced gear wheels so as to effect differential rotation of the gear wheels, the intermediate gear wheel being elliptical, the minor axis of the ellipse lying along a line joining the centers of the gear wheels when the intermediate gear wheel is symmetrically disposed between them, and the eccentricity of the ellipse being such that as the intermediate gear wheel moves laterally the increase in the distance apart of the portions of the gear wheels with which it meshes is substantially compensated for by the increase in the effective diameter of the intermediate gear wheel between those portions, as a result of its rotation, so that the intermediate gear wheel remains in mesh with the gear wheels during said lateral movement.

2. A differential gear mechanism according to claim 1 wherein said means causing the intermediate gear wheel to move laterally as it rotates comprise a sliding connection between the intermediate gear wheel and a fixed member, the connection being offset from the center of the intermediate gear wheel.

3. A differential gear mechanism according to claim 2 wherein the sliding connection comprises a guide on the fixed member, and a follower on the intermediate gear wheel, the follower being offset from the center of the intermediate gear wheel so that engagement of the follower with the guide, as the intermediate gear wheel rotates effects said lateral movement of the intermediate gear wheel.

4. A differential gear mechanism according to claim 3 wherein the guide extends in a substantially straight line.

5. A differential gear mechanism according to claim 4 wherein the guide lies along the line joining the center of the two gear wheels, the follower lying on the minor axis of the ellipse.

6. A differential gear mechanism according to claim 3 wherein the guide comprises a slot in the fixed member and the follower comprises a member projecting from the intermediate gear wheel and slidable along the slot.

* * * * *